United States Patent
Fujii et al.

(10) Patent No.: US 11,480,493 B2
(45) Date of Patent: Oct. 25, 2022

(54) GAS SAFETY DEVICE

(71) Applicant: Panasonic Intellectual Property Management Co., Ltd., Osaka (JP)

(72) Inventors: Yuji Fujii, Nara (JP); Takashi Kayaba, Kyoto (JP); Yoshihiro Ueda, Nara (JP); Kenji Yasuda, Kyoto (JP); Taiti Gyoutoku, Kyoto (JP); Hideki Kinoshita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 16/968,763

(22) PCT Filed: Mar. 14, 2019

(86) PCT No.: PCT/JP2019/010444
§ 371 (c)(1),
(2) Date: Aug. 10, 2020

(87) PCT Pub. No.: WO2019/188317
PCT Pub. Date: Oct. 3, 2019

(65) Prior Publication Data
US 2021/0010894 A1 Jan. 14, 2021

(30) Foreign Application Priority Data
Mar. 30, 2018 (JP) .............................. JP2018-067342

(51) Int. Cl.
*G01M 3/28* (2006.01)
*G01F 1/66* (2022.01)

(52) U.S. Cl.
CPC ................ *G01M 3/28* (2013.01); *G01F 1/66* (2013.01)

(58) Field of Classification Search
CPC .. G01M 3/28; G01M 3/26; G01F 1/66; G01F 15/005; G01F 1/662; G01F 1/667; G01F 1/72
(Continued)

(56) References Cited

FOREIGN PATENT DOCUMENTS

JP        2001-241985         9/2001
JP        2001241984 A   *   9/2001
(Continued)

OTHER PUBLICATIONS

Translation of Ueda, JP-2001241984-A (Year: 2001).*
(Continued)

*Primary Examiner* — Nathaniel T Woodward
(74) *Attorney, Agent, or Firm* — Wenderoth, Lind & Ponack, L.L.P.

(57) ABSTRACT

A gas safety device includes: flow path through which a gas flows; ultrasonic sensor for measuring a flow rate of the gas flowing through flow path; flow rate calculator that calculates a flow rate measurement data pieces from a measurement value of the flow rate measured by ultrasonic sensor; and leakage detector that detects a minor leakage of the gas. The gas safety device further includes: pulsation recognizer that recognizes that pulsation is occurring when a fluctuation in the flow rate measuring data pieces calculated by flow rate calculator is greater than or equal to a predetermined value; and pulsating flow rate corrector that corrects, when pulsation recognizer determines that the pulsation is occurring, the flow rate measurement data piece by a predetermined value. Furthermore, when pulsation recognizer determines that the pulsation is occurring, leakage detector determines whether a leakage is present using the flow rate measurement data piece corrected by pulsating flow rate corrector.

2 Claims, 7 Drawing Sheets

(58) Field of Classification Search
USPC .......................................................... 73/40.5 R
See application file for complete search history.

(56) References Cited

FOREIGN PATENT DOCUMENTS

| | | | | |
|---|---|---|---|---|
| JP | 2001241985 A | * | 9/2001 | |
| JP | 2002-116066 | | 4/2002 | |
| JP | 2003-222548 | | 8/2003 | |
| JP | 2003-315132 | | 11/2003 | |
| JP | 2004-125609 | | 4/2004 | |
| JP | 2010-160040 | | 7/2010 | |
| JP | 2010-216724 | | 9/2010 | |
| JP | 2012-194142 | | 10/2012 | |
| JP | 2012194142 A | * | 10/2012 | |
| WO | 2010/079758 | | 7/2010 | |
| WO | WO-2010079758 A1 | * | 7/2010 | ............. G01F 1/667 |

OTHER PUBLICATIONS

Translation of JP-2012194142-A (provided by Applicant) (Year: 2012).*
Translation of JP-2001241985-A (provided by Applicant) (Year: 2001).*
Extended European Search Report dated Apr. 21, 2021 in corresponding European Patent Application No. 19774990.6.
International Search Report of PCT application No. PCT/JP2019/010444 dated May 28, 2019.

\* cited by examiner

GAS SAFETY DEVICE

CROSS-REFERENCE TO RELATED APPLICATIONS

This application is a U.S. national stage application of the PCT International Application No. PCT/JP2019/010444 filed on Mar. 14, 2019, which claims the benefit of foreign priority of Japanese patent application No. 2018-067342 filed on Mar. 30, 2018, the contents all of which are incorporated herein by reference.

TECHNICAL FIELD

The present invention relates to a gas safety device that measures a gas flow rate, blocks a gas flow path when an abnormal flow rate is measured, and secures safety in use of a gas.

BACKGROUND ART

Among gas meters that measure the amount of gas consumption, some gas meters having become widespread in recent years contain a gas safety device that ensures safety by determining that an abnormality has occurred to block a gas flow path when a high flow rate is measured or when the gas has been consumed for an unusually long period of time.

In addition, some gas safety devices have a function of notifying a center that a minor gas leakage has occurred when the gas flow rate remains constant over a certain period of time although the flow rate is very low.

For this type of gas safety device to measure a flow rate, either a diaphragm meter that measures a flow rate based on the volume that has passed through the meter within a predetermined time period or an ultrasonic meter that measures an instantaneous flow rate by activating an ultrasonic sensor at predetermined time intervals is used.

However, in cases where, for example, a gas cooling and heating apparatus of a gas heat pump (GHP) type is installed downstream of the ultrasonic meter that measures a gas flow at predetermined time intervals, the ultrasonic meter is problematic in that the flow rate measurement result varies with pulsation of a gas pressure generated after start of operation of the gas cooling and heating apparatus. Against this phenomenon, some conventional ultrasonic meters employ measures by which a continuous time period equal to an integer multiple of the pulsation frequency is used as a flow rate measuring time to reduce the influence of the pulsation. Furthermore, some gas safety devices prevent erroneous detection by stopping the function of detecting a gas leakage when a fluctuation in the flow rate is detected.

A conventional gas safety device is described below with reference to FIG. 7.

FIG. 7 is a configuration diagram of a conventional gas safety device. The conventional gas safety device measures the flow rate of a gas flowing through flow path 2 with a pair of ultrasonic sensors 1 and ultrasonic sensor drive circuit 3. Control circuit 4 integrates the amount of gas consumption using the flow rate measurement data piece measured in ultrasonic sensor drive circuit 3. A general gas safety device usually has a function of displaying the integration result. Then, when control circuit 4 determines that the gas usage pattern is abnormal, control circuit 4 sends a shutoff instruction signal to shutoff valve drive circuit 7 to close shutoff valve 8 disposed across flow path 2 so that the gas is shut off. In addition, control circuit 4 includes leakage detector 14 that determines that a gas leakage has occurred when the flow rate measurement result continues to be a value other than 0 (L/h) for at least a predetermined time period. When it is determined that a leakage has occurred, leakage alarm 13 disposed in control circuit 4 indicates that a gas leakage has occurred. Furthermore, pulsation recognizer 5 is disposed in control circuit 4 in consideration of the pulsation that may occur depending on the gas installation conditions, and control circuit 4 has a function of preventing leakage alarm stopper 12 from erroneously alerting that a gas leakage has occurred when pulsation recognizer 5 recognizes the occurrence of pulsation (see, for example, PTL 1). Moreover, a gas safety device of this type reduces the influence of pulsation of a gas flow rate by setting flow rate measuring time Ta to a time period equal to an integer multiple of the period of pulsation of the gas flow rate as illustrated in FIG. 8 (see, for example, PTL 2). Here, T in the figure represents a measurement interval at which flow rate measurement data piece is output from the ultrasonic sensor drive circuit.

CITATION LIST

Patent Literature

PTL 1: Unexamined Japanese Patent Publication No. 2001-241985

PTL 2: Unexamined Japanese Patent Publication No. 2003-315132

SUMMARY OF THE INVENTION

However, for ultrasonic meters disposed on a conventional gas safety device, specifications about a flow rate measuring time are defined on the assumptions that fluctuations in flow rate due to pulsation in a forward direction and a reverse direction are symmetrical and that the frequency of the pulsation is a predetermined value. As a result, conventional gas safety devices remain problematic in that a flow rate measurement result may unexpectedly greatly vary depending on the structure of the flow rate measuring unit or environmental change in the market, and that the leakage detecting function of detecting a gas leakage may often fail to work properly.

The present invention provides a gas safety device that normally fulfils the function of detecting a leakage even when a considerable influence of pulsation of a gas flow rate is exerted.

A gas safety device of the present invention includes: a flow path through which a gas flows; an ultrasonic sensor for measuring a flow rate of the gas flowing through the flow path; a flow rate calculator that calculates a flow rate measurement data piece from a measurement value of the flow rate measured by the ultrasonic sensor; and a leakage detector that detects a minor leakage of the gas. In addition, the gas safety device of the present invention includes: a pulsation recognizer that recognizes that pulsation is occurring in the gas flow rate when a fluctuation in the flow rate measuring data piece calculated by the flow rate calculator is greater than or equal to a predetermined value; and a pulsating flow rate corrector that corrects, when the pulsation recognizer determines that the pulsation is occurring in the gas flow rate, the flow rate measurement data piece by a predetermined value.

Furthermore, in the gas safety device of the present invention, when the pulsation recognizer determines that the pulsation is occurring, the leakage detector determines whether a leakage is present using the flow rate measurement data piece corrected by the pulsating flow rate corrector. With this configuration, it is made possible to reliably determine whether a leakage is detected even when a greater influence of pulsation of a gas flow rate is exerted due to difference in structure or installation conditions of the meter.

The gas safety device of the present invention eliminates the need for symmetrical shapes of buffers and a flow rate measuring unit that have been conventionally needed, the buffers being disposed at an inlet and an outlet of the measuring unit. Therefore, the gas safety device of the present invention can have a more flexible meter configuration, which not only reduces the cost of the gas safety device but also achieves more reliable leakage detection, thereby improving the safety of the gas usage environment.

DESCRIPTION OF EMBODIMENTS

A gas safety device according to exemplary embodiments of the present invention will now be described with reference to the drawings. Note that the present invention is not limited to any of the exemplary embodiments.

First Exemplary Embodiment

Figure 1:
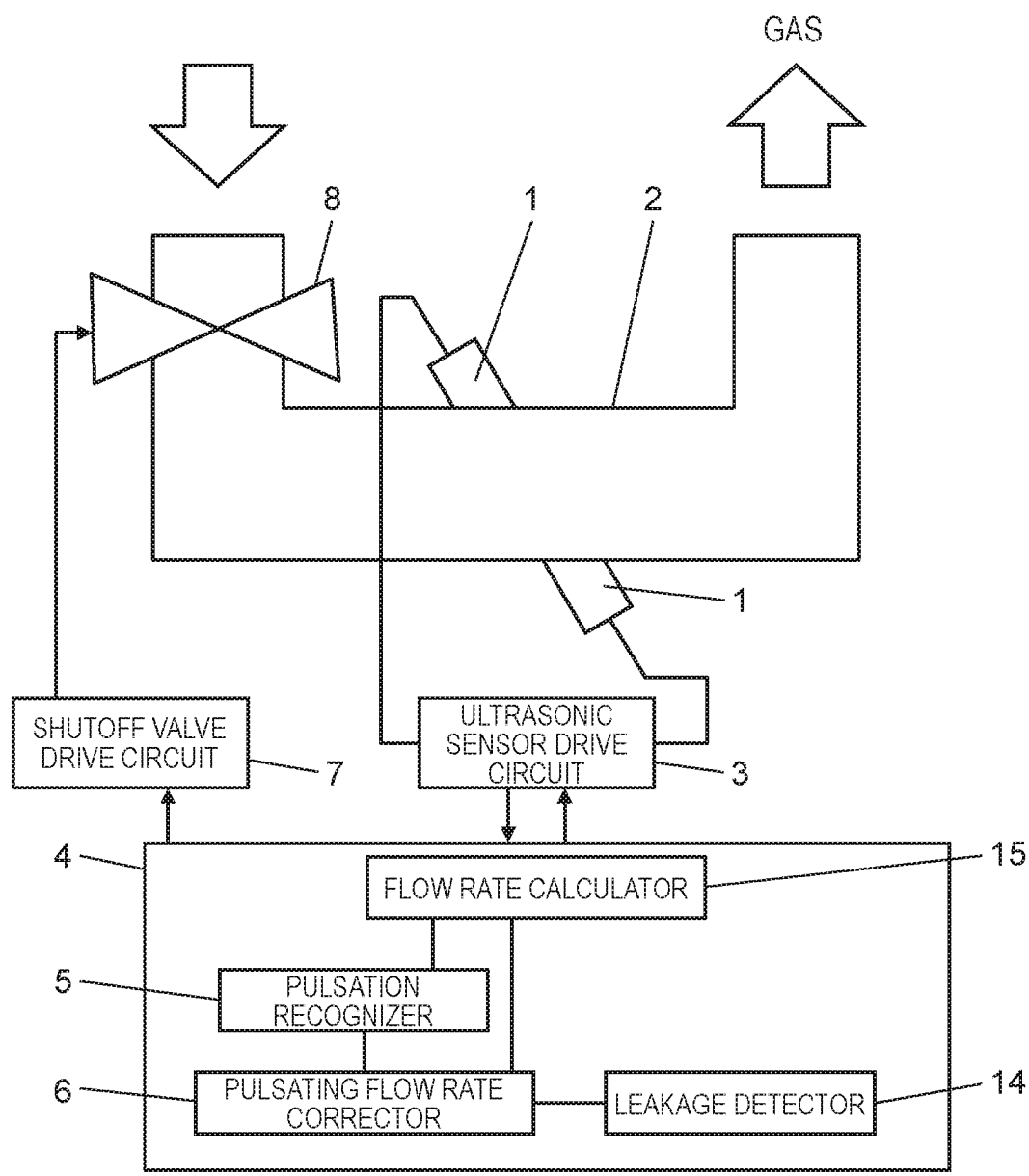
FIG. 1 is a configuration diagram of a gas safety device according to a first exemplary embodiment of the present invention.

FIG. 1 is a configuration diagram of a gas safety device according to a first exemplary embodiment of the present invention.

As illustrated in FIG. 1, the gas safety device according to the present exemplary embodiment includes flow path 2 for flowing a gas, a pair of ultrasonic sensors 1 for measuring a flow rate of the gas flowing through flow path 2, ultrasonic sensor drive circuit 3 that drives ultrasonic sensors 1, and control circuit 4 that controls ultrasonic sensor drive circuit 3.

Control circuit 4 includes flow rate calculator 15 that obtains the gas flow rate from an ultrasonic wave propagation time between the pair of ultrasonic sensors 1, and also includes pulsation recognizer 5 that recognizes that pulsation of a gas flow rate is occurring when a fluctuation in the flow rate measurement data piece calculated by flow rate calculator 15 is greater than or equal to a predetermined value. In addition, control circuit 4 includes pulsating flow rate corrector 6 that corrects, when pulsation recognizer 5 recognizes that pulsation is present, the flow rate measurement data piece calculated by flow rate calculator 15 by a predetermined value, and also includes leakage detector 14 that detects the presence or absence of a gas leakage using the flow rate measurement data piece corrected by pulsating flow rate corrector 6.

Figure 4:
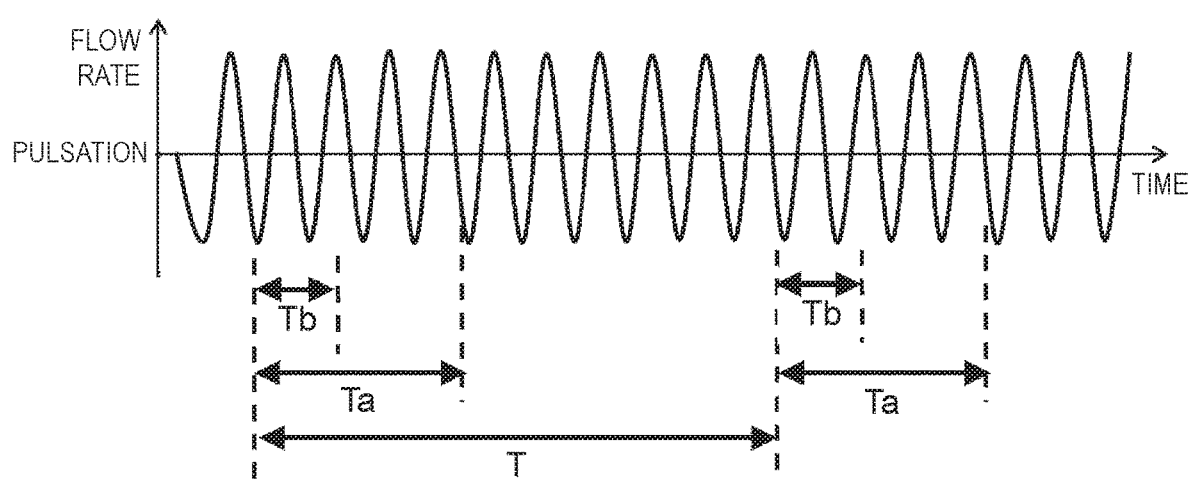
FIG. 4 is a timing image diagram of a flow rate measuring time provided by a pulsation recognizer of the gas safety device according to a second exemplary embodiment of the present invention.

Flow rate calculator 15 controls ultrasonic sensor drive circuit 3 to repeatedly perform flow rate measurement for predetermined flow rate measuring time Ta in a cycle of predetermined measurement interval T, as illustrated in FIG. 4.

The following describes operations and actions of the gas safety device configured as above.

Figure 7:
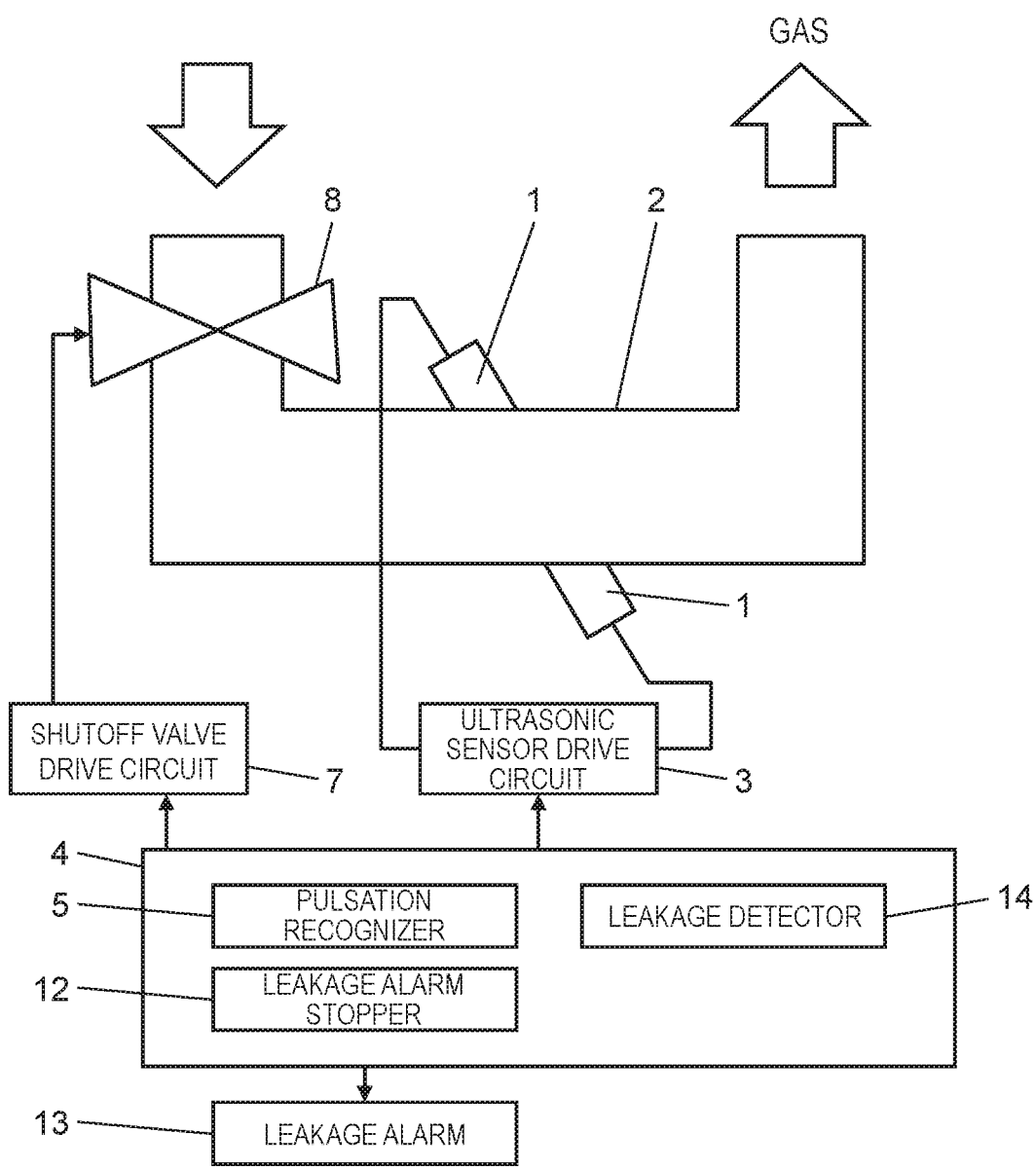
FIG. 7 is a configuration diagram of a conventional gas safety device.
Figure 8:
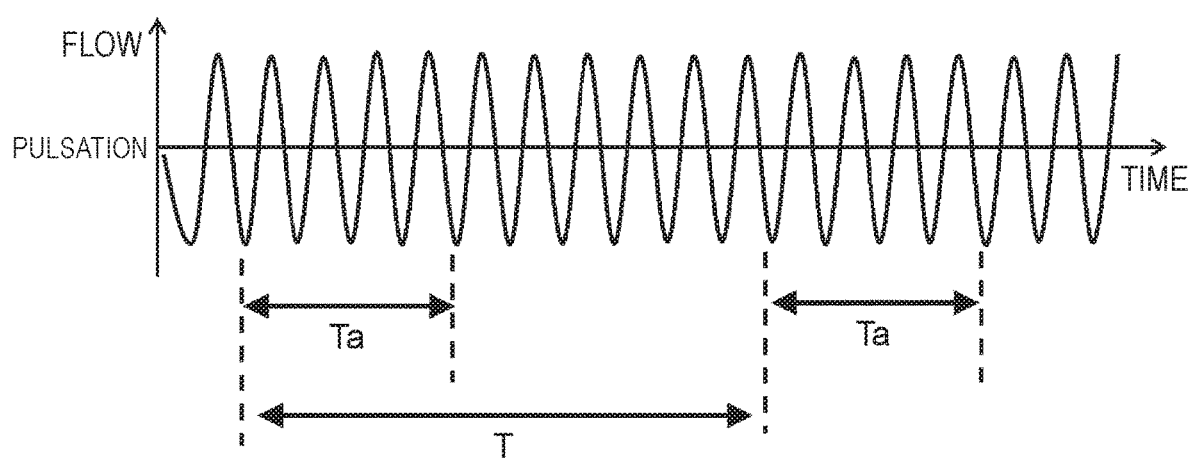
FIG. 8 is a timing image diagram of a flow rate measuring time for the conventional gas safety device.

First of all, basic operations of the gas safety device according to the present exemplary embodiment are the same as the operations of the conventional art described above with reference to FIG. 7. The flow rate of a gas flowing through flow path 2 is measured by the pair of ultrasonic sensors 1 and ultrasonic sensor drive circuit 3, and the amount of gas consumption is integrated by control circuit 4 by using the flow rate measurement data piece measured in ultrasonic sensor drive circuit 3. In addition, control circuit 4 performs a predetermined number of measurements of the ultrasonic wave propagation time for predetermined flow rate measuring time Ta to calculate the flow rate measurement data piece, and outputs the flow rate measurement data piece at predetermined measurement intervals T. A feature of the present invention is that pulsating flow rate corrector 6 is disposed in control circuit 4.

Figure 2:
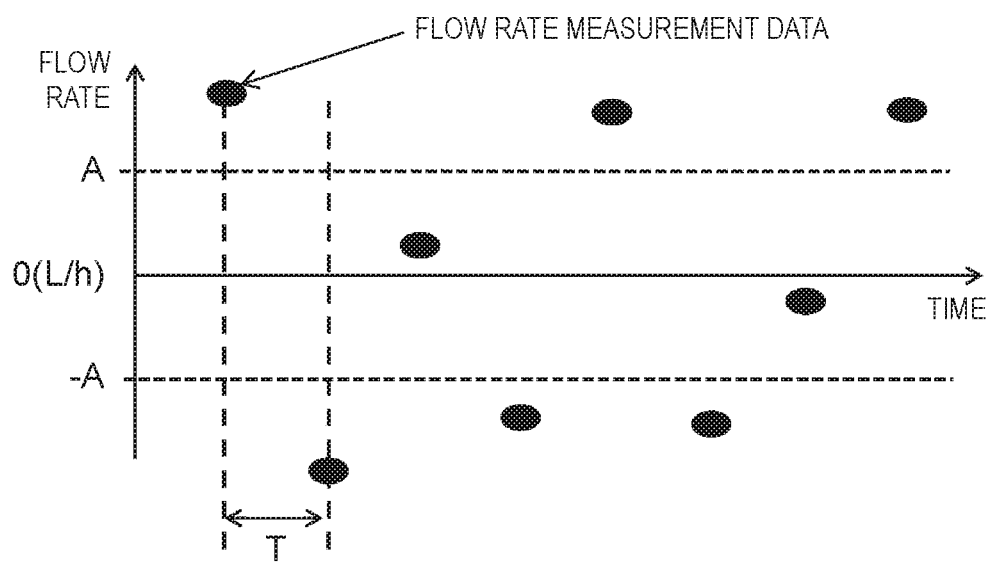
FIG. 2 is a diagram illustrating a first example of fluctuations in a flow rate measurement result of a gas flow rate during pulsation as provided by the gas safety device according to the first exemplary embodiment of the present invention.

FIG. 2 is a diagram illustrating flow rate measurement data piece measured at predetermined measurement intervals T when the gas appliance is not used, that is, when the flow rate should be 0 (L/h). The figure shows a case where fluctuations are observed in the measured flow rate measurement data piece under the influence of pulsation.

Then, when the flow rate measurement data piece fluctuates by at least a predetermined value as in FIG. 2 under the influence of pulsation, pulsation recognizer 5 determines that pulsation is present. A condition for determining that pulsation is present is that, among a predetermined number of pieces of flow rate measurement data piece, at least a predetermined number of pieces of the data piece represent a value greater than or equal to a predetermine flow rate value A (L/h) or less than or equal to –A (L/h).

Next, when pulsation recognizer 5 determines that pulsation is present, flow rate calculator 15 corrects the calculated flow rate measurement data piece with a predetermined value (correction value) determined in advance by pulsating flow rate corrector 6. Using the corrected flow rate measurement data piece, leakage detector 14 determines whether a leakage is actually occurring. The correction value is a value confirmed in advance when the structure of the meter was designed. The correction value is set to a value by which the average of flow rate measurement data pieces fluctuating during pulsation is shifted from 0 (L/h). As described above, in the present exemplary embodiment, the gas safety device includes pulsation recognizer 5 and pulsating flow rate corrector 6 to make it possible to accurately detect a leakage even when pulsation beyond expectation occurs, thereby achieving a gas safety device ensuring greater safety.

Second Exemplary Embodiment

The basic configuration of the gas safety device according to a second exemplary embodiment of the present invention is the same as the basic configuration of the gas safety device according to the first exemplary embodiment illustrated in FIG. 1. However, the gas safety device according to the present exemplary embodiment differs from the gas safety device according the first exemplary embodiment in operations of pulsation recognizer 5. The difference is that pulsation recognizer 5 of the present exemplary embodiment can also handle the case where the flow rate measurement data piece is shifted from 0 (L/h) as a whole as illustrated in FIG. 3 without significantly fluctuating under the influence of pulsation as illustrated in FIG. 2.

Figure 3:
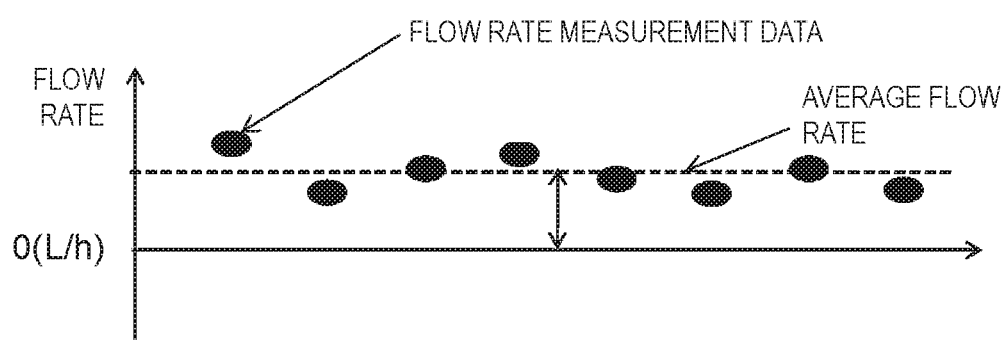
FIG. 3 is a diagram illustrating a second example of fluctuations in a flow rate measurement result of a gas flow rate during pulsation as provided by the gas safety device according to the first exemplary embodiment of the present invention.

When the average flow rate of a predetermined number of flow rate measurement data pieces is very small but falls within a predetermined range excluding 0 (L/h) as illustrated in FIG. 3, pulsation recognizer 5 of the present exemplary embodiment shortens flow rate measuring time Ta to flow rate measuring time Tb as in FIG. 4 and checks whether the flow rate measurement value fluctuates. If pulsation is occurring, averaging in accordance with the frequency of pulsation fails in a shortened flow rate measuring time, and thus the flow rate measurement data piece significantly fluctuates as illustrated in FIG. 2.

Therefore, in this state, it can be determined whether pulsation is present under the same determination conditions as in the first exemplary embodiment. Resultingly, the measurement result is corrected by the correction value that is determined in advance depending on the meter structure, and leakage detector 14 determines whether a leakage is actually occurring.

As described above, in the present exemplary embodiment, the gas safety device includes pulsation recognizer 5 and pulsating flow rate corrector 6 to make it possible to accurately detect a leakage even when pulsation occurs, thereby achieving a gas safety device ensuring greater safety.

Third Exemplary Embodiment

Figure 5:
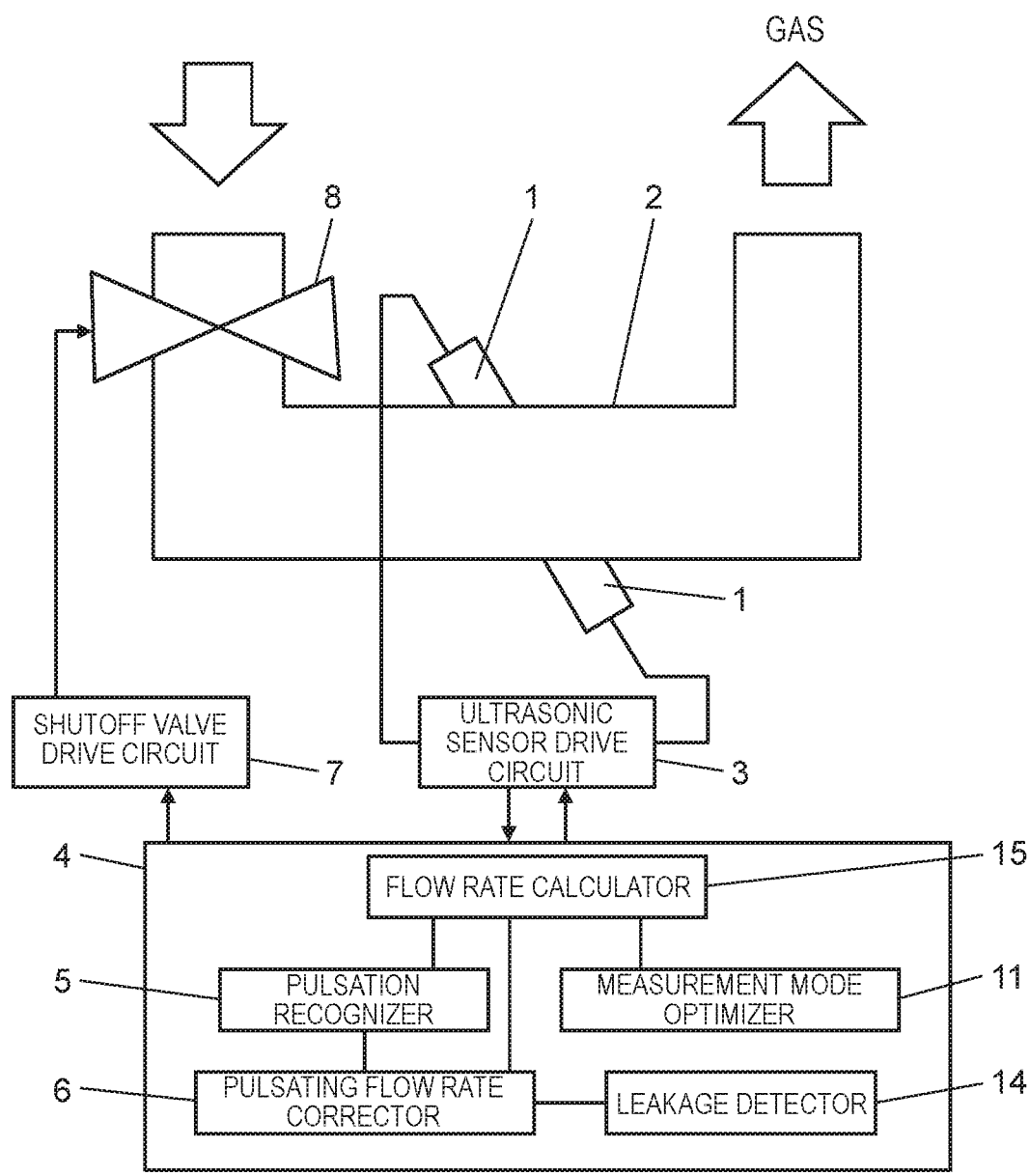
FIG. 5 is a configuration diagram of a gas safety device according to a third exemplary embodiment of the present invention.

FIG. 5 is a configuration diagram of a gas safety device according to a third exemplary embodiment of the present invention.

As illustrated in FIG. 5, the gas safety device according to the present exemplary embodiment includes flow path 2 for flowing a gas, a pair of ultrasonic sensors 1 for measuring a flow rate of the gas flowing through flow path 2, ultrasonic sensor drive circuit 3 that drives ultrasonic sensors 1, and control circuit 4 that controls ultrasonic sensor drive circuit 3.

Control circuit 4 includes flow rate calculator 15 that obtains the gas flow rate from an ultrasonic wave propagation time between ultrasonic sensors 1 and also includes pulsation recognizer 5 that recognizes that pulsation of a gas flow rate is occurring when a fluctuation in the flow rate measurement data piece calculated by flow rate calculator 15 is greater than or equal to a predetermined value. In addition, control circuit 4 includes pulsating flow rate corrector 6 that corrects, when pulsation recognizer 5 recognizes that pulsation is present, the flow rate measurement data piece calculated by flow rate calculator 15 by a predetermined value. Furthermore, control circuit 4 includes measurement mode optimizer 11 that changes, when pulsation recognizer 5 determines that pulsation is present, the flow rate measuring time to re-set the normal measurement mode with a new flow rate measuring time in which the average of flow rate measurement data piece obtained by ultrasonic sensors 1 performing a predetermined number of measurements of propagation time is closest to 0 (L/h).

The following describes operations and actions of the gas safety device configured as above.

First of all, basic operations are the same as the operations described in the first exemplary embodiment with reference to FIG. 1. A feature of the gas safety device according to the present exemplary embodiment is that measurement mode optimizer 11 is disposed in control circuit 4.

Figure 6:
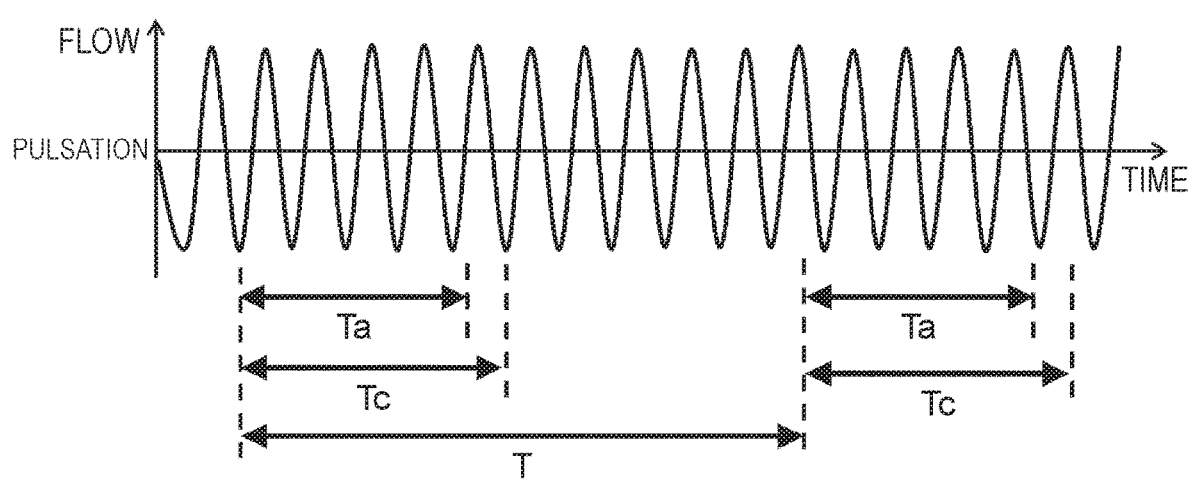
FIG. 6 is a timing image diagram of a flow rate measuring time provided by a measurement mode optimizer of the gas safety device according to the third exemplary embodiment of the present invention.

In the present exemplary embodiment, when pulsation recognizer 5 determines that pulsation is present, measurement mode optimizer 11 changes flow rate measuring time Ta little by little as shown in FIG. 6 (a new flow rate measuring time is denoted by Tc), and checks whether the average of the flow rate measurement data piece obtained by ultrasonic sensors 1 performing a predetermined number of measurements of propagation time approaches 0 (L/h).

Then, flow rate measuring time Tc in which the average is closest to 0 (L/h) is stored as the optimum measurement mode under the installation conditions of this gas safety device, and subsequent flow rate measurements are performed in the stored measurement mode.

As described above, in the present exemplary embodiment, the gas safety device includes pulsation recognizer 5, pulsating flow rate corrector 6, and measurement mode optimizer 11 to make it possible to accurately detect a leakage even when the influence of the occurrence of pulsation varies depending on the installation conditions of the gas safety device, thereby achieving a gas safety device ensuring greater safety.

As described above, a gas safety device according to a first aspect includes: a flow path through which a gas flows; an ultrasonic sensor for measuring a flow rate of the gas flowing through the flow path; a flow rate calculator that calculates a flow rate measurement data piece from a measurement value of the flow rate measured by the ultrasonic sensor; and a leakage detector that detects a minor leakage of the gas. In addition, the gas safety device according to the first aspect includes: pulsation recognizer that recognizes that pulsation is occurring when a fluctuation in the flow rate measuring data piece calculated by the flow rate calculator is greater than or equal to a predetermined value; and pulsating flow rate corrector that corrects, when the pulsation recognizer determines that the pulsation is occurring, the flow rate measurement data piece by a predetermined value. Furthermore, in the gas safety device according to the first aspect, when the pulsation recognizer determines that the pulsation is occurring, the leakage detector determines whether a leakage is present using the flow rate measurement data piece corrected by the pulsating flow rate corrector.

With this configuration, the gas safety device according to the first aspect can accurately determine whether a gas leakage is present even when the influence of pulsation cannot be reduced in a conventional measurement mode due to the structure or installation conditions of the meter.

In the gas safety device according to a second aspect, when, in particular in the first aspect, an average of a predetermined number of the flow rate measurement data pieces falls within a predetermined range excluding 0 (L/h) during a time period of measurement performed by the ultrasonic sensor while a predetermined gas appliance is assumed to be not in use, the pulsation recognizer may shorten the flow rate measuring time of the ultrasonic sensor.

With this configuration, pulsation can be recognized even when the flow rate measurement data piece provided by the ultrasonic sensors is shifted without fluctuating under the influence of pulsation due to the structure or installation conditions of the meter. Furthermore, the gas safety device includes the pulsating flow rate corrector that corrects, on the basis of a signal from the pulsation recognizer, the flow rate measurement data piece supplied from the ultrasonic sensors by a predetermined value. Therefore, it is made possible to provide the gas safety device that accurately determines that a gas leakage is present even when the influence of pulsation cannot be reduced in a conventional measurement mode due to the structure or installation conditions of the meter.

The gas safety device according to a third aspect may include a measurement mode optimizer that changes, when, in particular in the first aspect, the pulsation recognizer determines that pulsation is occurring, the flow rate measuring time of the ultrasonic sensor to re-set the normal measurement mode with a new flow rate measuring time of the ultrasonic sensor in which the average of flow rate measurement data pieces provided by the ultrasonic sensor for a predetermined number of measurements is closest to 0 (L/h).

With this configuration, it is made possible to provide the gas safety device that can accurately determine whether a gas leakage is present even when the gas safety device is likely to suffer the influence of pulsation due to the installation conditions, because the gas safety device is capable of automatically switching to a measurement mode suitable for the installation site.

INDUSTRIAL APPLICABILITY

As described above, the gas safety device according to the present aspect can accurately detect a leakage by correcting any influence of the structure or installation conditions, the influence leading to pulsation to produce an abnormal flow rate measurement result. Therefore, the gas safety device achieves much greater safety of a gas operating environment and can be used for general household and business applications.

REFERENCE MARKS IN THE DRAWINGS 1 ultrasonic sensor
2 flow path
3 ultrasonic sensor drive circuit
4 control circuit
5 pulsation recognizer
6 pulsating flow rate corrector
7 shutoff valve drive circuit
8 shutoff valve
11 measurement mode optimizer
12 leakage alarm stopper
13 leakage alarm
14 leakage detector
15 flow rate calculator

The invention claimed is:

1. A gas safety device comprising:
a flow path through which a gas flows;
an ultrasonic sensor for measuring a flow rate of the gas flowing through the flow path;
a flow rate calculator that calculates a flow rate measurement data piece from a measurement value of the flow rate measured by the ultrasonic sensor;
a leakage detector that detects a minor leakage of the gas;
a pulsation recognizer configured to recognize that pulsation is occurring, when a fluctuation in the flow rate measuring data piece calculated by the flow rate calculator is greater than or equal to a predetermined value; and
a pulsating flow rate corrector configured to correct the flow rate measurement data piece, when the pulsation recognizer determines that the pulsation is occurring, the pulsating flow rate corrector is configured to correct the flow rate measurement data piece to a value confirmed in advance at the time of designing, the value being a value at which the average value of the flow rate measurement data piece shifts from the flow rate of 0 (L/H),
wherein when the pulsation recognizer determines that the pulsation is occurring, the leakage detector determines whether a leakage is present using the flow rate measurement data piece corrected by the pulsating flow rate corrector.

2. The gas safety device according to claim 1, wherein the pulsation recognizer is configured to shorten a flow rate measuring time of the ultrasonic sensor when an average of a predetermined number of the flow rate measurement data pieces falls within a predetermined range excluding 0 L/h during a time period of the measurement performed by the ultrasonic sensor while a predetermined gas appliance is assumed to be not in use.

* * * * *